United States Patent [19]
Weir

[11] 3,866,768
[45] Feb. 18, 1975

[54] LOADING AND UNLOADING CONVEYOR
[75] Inventor: Stanley M. Weir, Santa Clara, Calif.
[73] Assignee: FMC Corporation, San Jose, Calif.
[22] Filed: Aug. 1, 1972
[21] Appl. No.: 277,028

Related U.S. Application Data
[62] Division of Ser. No. 147,921, May 28, 1971, Pat. No. 3,715,043, which is a division of Ser. No. 20,711, March 18, 1970, Pat. No. 3,613,910.

[52] U.S. Cl. ................................. 214/38 B, 198/88
[51] Int. Cl. ............................................. B65g 67/02
[58] Field of Search .......... 214/38 B, 38 BA, 38 C, 214/508, 510, 514, 519–522, 83.3; 198/88, 90, 91, 97, 99, 106, 219, 14

[56] References Cited
UNITED STATES PATENTS
| 1,260,059 | 3/1918 | Rieke | 198/14 |
| 2,628,734 | 2/1953 | Jannsen | 214/750 |
| 3,337,066 | 8/1967 | Reed et al. | 214/38 C |
| 3,341,039 | 9/1967 | Cranage | 214/522 X |
| 3,415,400 | 12/1968 | Olin | 198/219 X |

Primary Examiner—Robert G. Sheridan
Attorney, Agent, or Firm—J. F. Verhoeven; C. E. Tripp

[57] ABSTRACT

A loading-unloading conveyor boom is vertically adjustable with a ramp pivotally attached at one end that can be independently tilted up or down. The ramp has a set of movable wedge-shaped finger members for moving freight from its wedge-shaped finger tips to the conveyor boom or vice-versa. All motions of the loading-unloading conveyor boom are controlled by an operator working in the vicinity of the ramp. The loading-unloading boom is of fixed length, and is pivoted by a motorized cart that also moves an air-bearing supported platform on which a freight carrier or container rests, backward or forward and sideways left or right.

2 Claims, 10 Drawing Figures

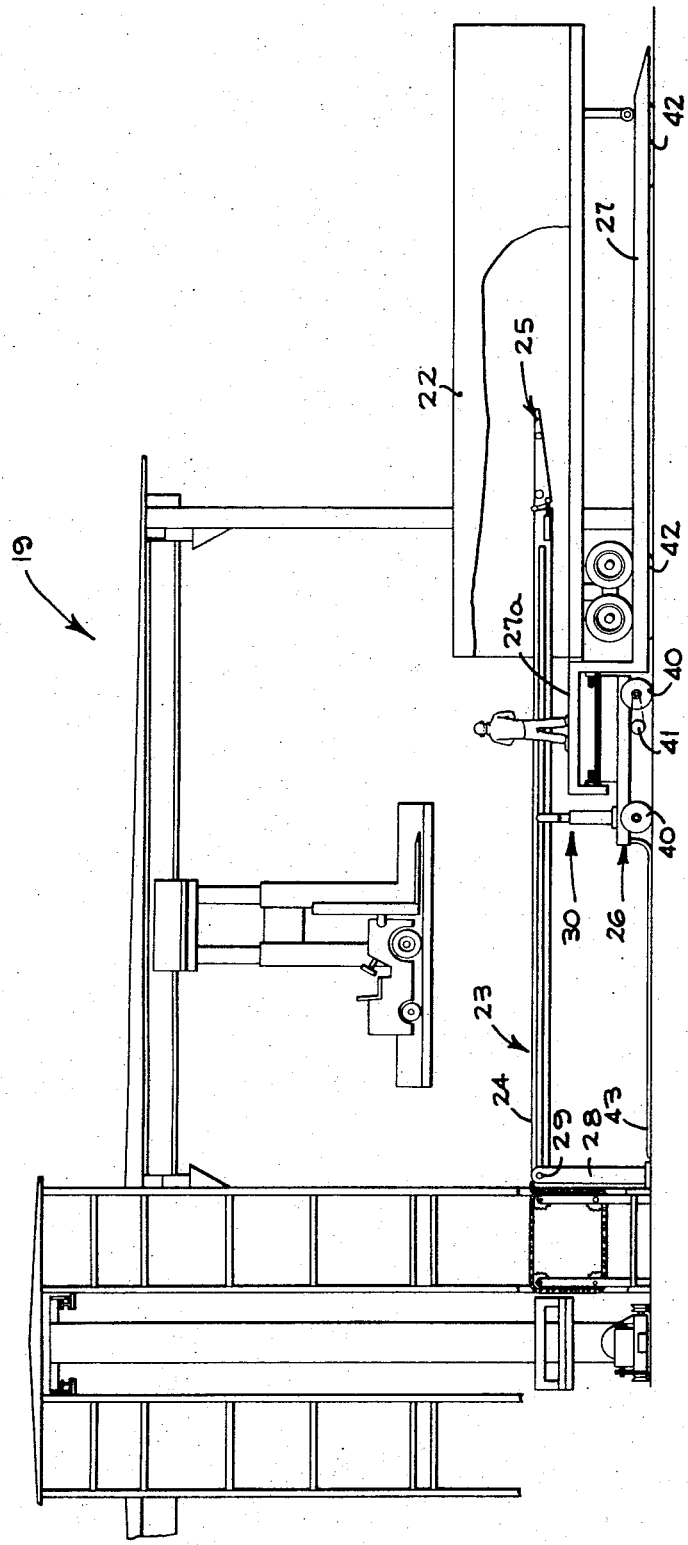
FIG_1

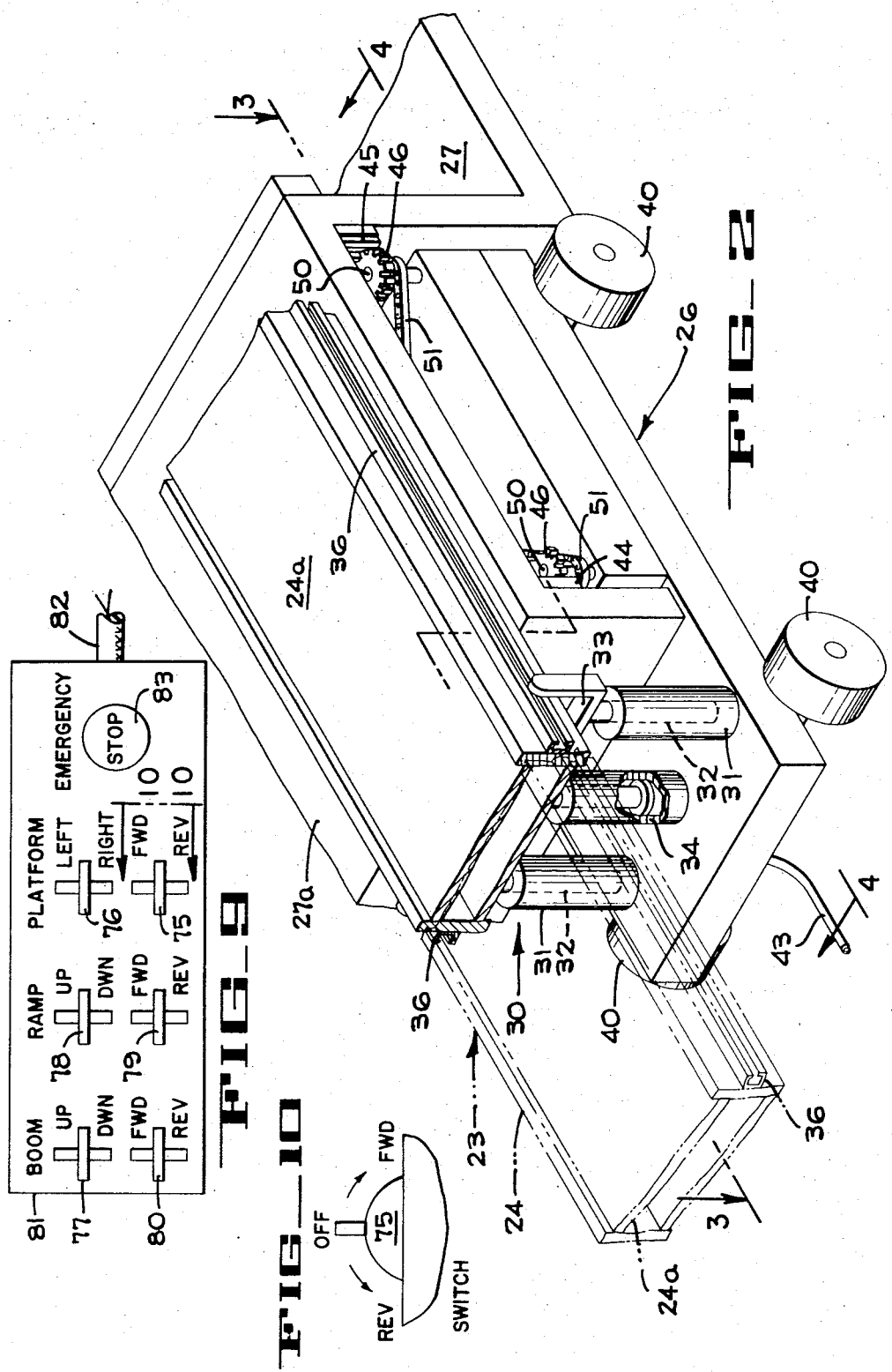

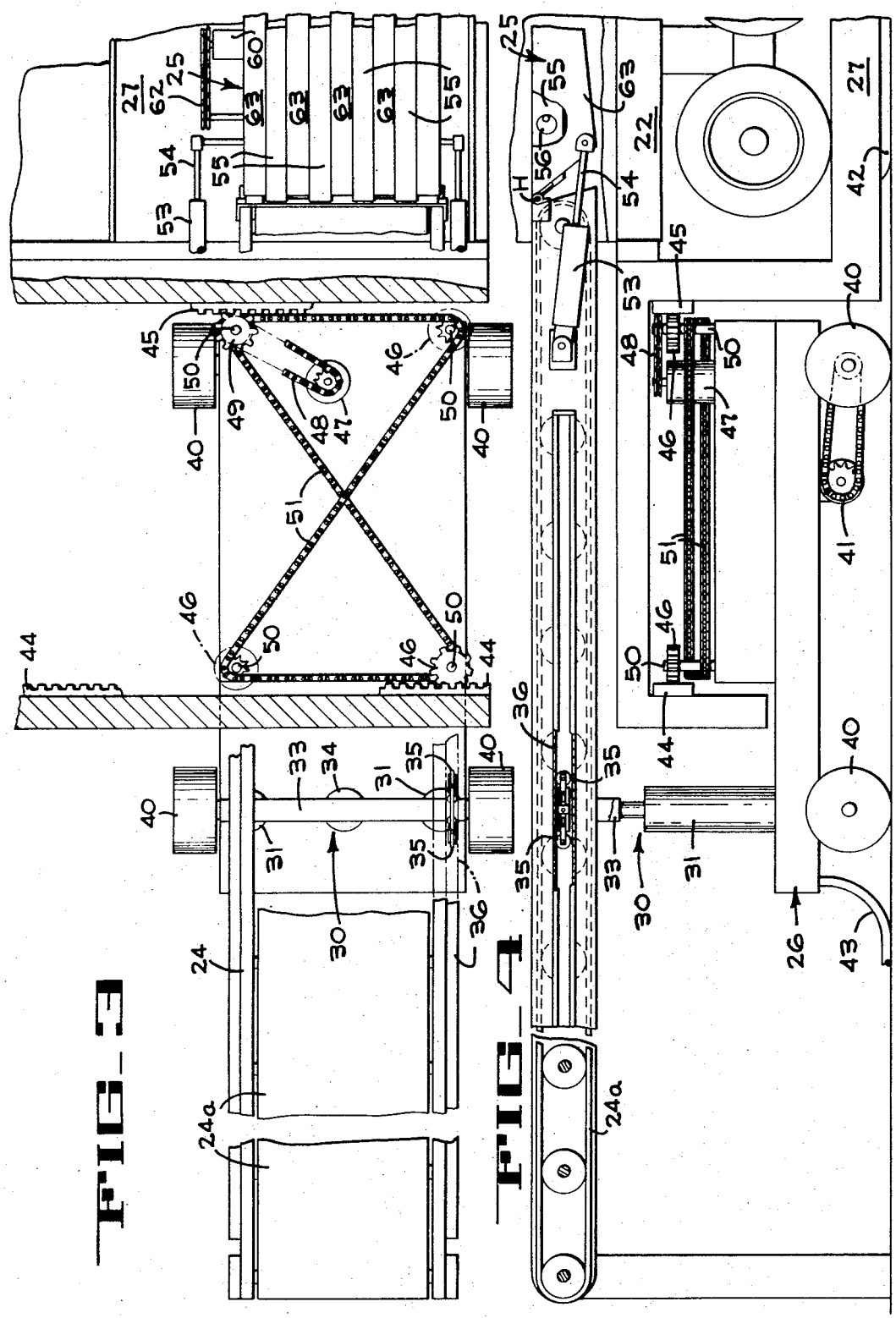

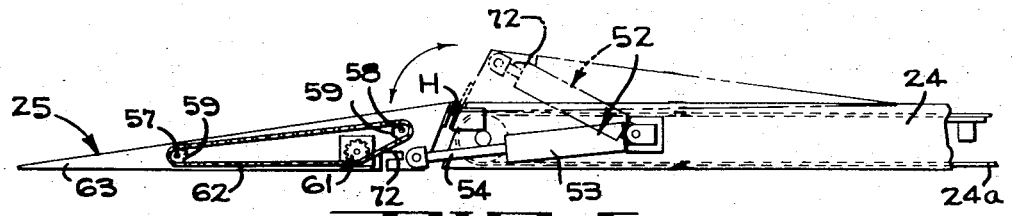
FIG_5
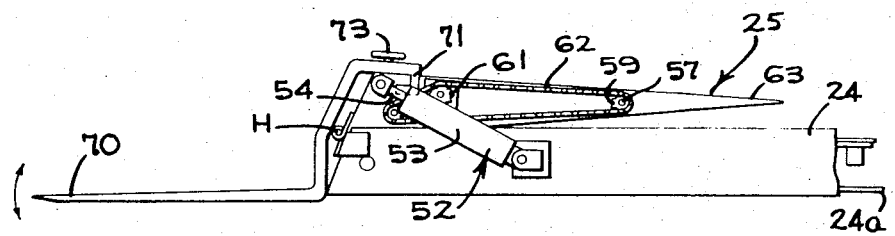
FIG_6
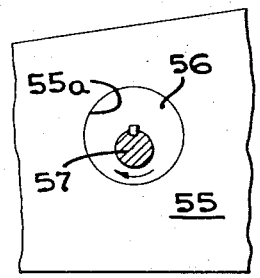
FIG_8
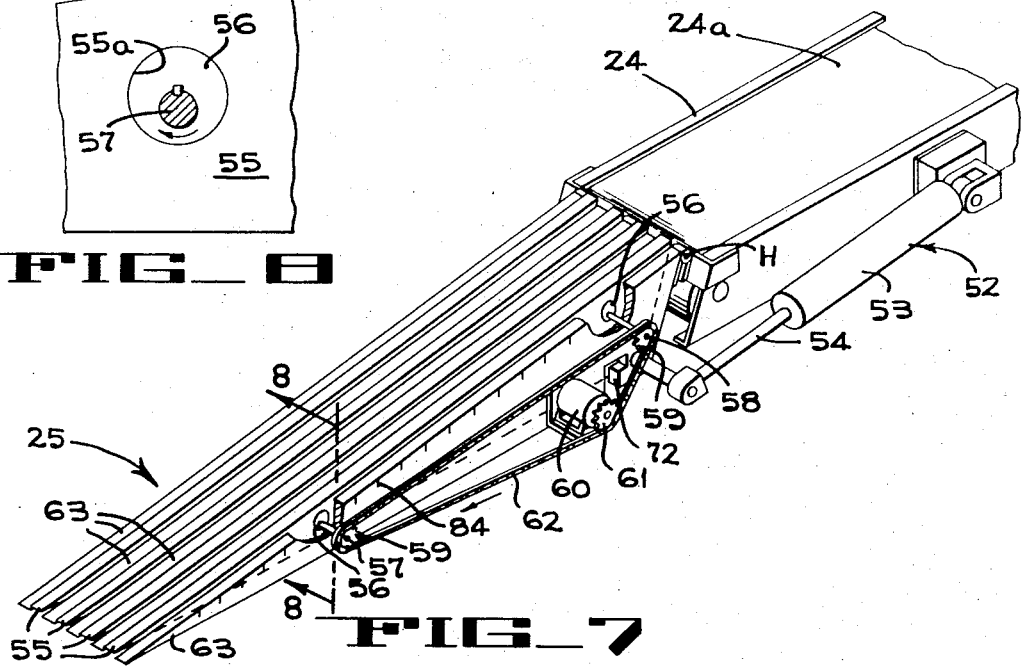
FIG_7

LOADING AND UNLOADING CONVEYOR

This application is a division of application Ser. No. 147,921 filed May 28, 1971, now Pat. No. 3,715,043, which, in turn, was a division of application Ser. No. 20,711 filed Mar. 18, 1970, now U.S. Pat. No. 3,613,910.

BACKGROUND OF THE INVENTION

The present invention relates to an automatic terminal for loading, unloading and moving shipments from one freight container to another.

In a typical conventional terminal, such as a truck terminal, articles are manually unloaded from inbound trucks onto pushcarts. If an article is too heavy to manually lift, fork-trucks are used. Loaded carts are manually pushed to the appropriate terminal door for load-out or, where towlines are installed for transporting carts, carts are manually hooked onto and removed from the towline.

Some problems associated with unloading and loading trucks using carts are:
1. Carts sometimes cannot be positioned near article pick-up and put-down points because large, long and/or heavy articles are on the floor. Dockmen must therefore carry articles across large heavy pieces to and from pushcarts to clear out top-off freight before a fork-truck can get in and move big articles out of the way;
2. A fork-truck is not always handy when needed to move a large or heavy piece and a dockman may need to wait until one arrives before resuming load or unload operation.

SUMMARY OF THE INVENTION

To reduce cost and speed up handling of freight, the present invention provides loading-unloading conveyor booms. Each boom has an endless belt to carry articles in one direction or the other thereon. The booms are pivotally mounted at one end so they may be tilted about a pivot axis. A short-wedge shaped ramp is connected on a pivot axis to the outer end of each boom. The ramp has mobile fingers which are interspersed with stationary fingers so that as the mobile fingers orbit, the mobile fingers rise above, and sink below, the top of the stationary fingers. The mobile fingers move the cargo in incremental steps in either direction. When an inbound truck arrives, an operator controls the conveyor and ramp to scoop articles onto the ramp.

BRIEF DESCRIPTION OF THE DRAWINGS

FIG. 1 is a view in elevation of the conveyor and ramp of the present invention;

FIG. 2 is a view in perspective of a platform cart to support a conveyor;

FIG. 3 is a view taken on the lines 3—3 of FIG. 2;

FIG. 4 is a view taken on the line 4—4 of FIG. 2;

FIG. 5 is a side view of the boom conveyor ramp, showing the ramp extended for operation in solid lines and showing the ramp folded back in dotted lines;

FIG. 6 is a view taken as the view of FIG. 5, showing the use of removable tines in place of the ramp;

FIG. 7 is a view in perspective of the ramp;

FIG. 8 is a view taken on the lines 8—8 of FIG. 7;

FIG. 9 is a top view of the operator's control box;

FIG. 10 is a view taken on the line 10—10 of FIG. 9.

DESCRIPTION OF THE PREFERRED EMBODIMENTS

Leading to each loading-unloading station of a truck terminal 19 is a loading-unloading arm, as shown best in FIG. 1. In the preferred form of the invention, the loading-unloading arm 23 consists of four major parts: a fixed length conveyor boom 24, a ramp 25, a motorized cart 26, and a platform 27. The fixed length conveyor boom 24, which has an endless belt 24a (FIG. 7) to carry articles in one direction or the other thereon, is pivotally mounted at one end to a standard 28 so that it may be tilted up or down about pivot axis 29. The conveyor boom 24 is slidably attached to supporting structure 30 (see FIGS. 4, 5 and 6) which is mounted on carriage 26. The supporting structure 30 has two guide cylinders 31 into each of which a guide plunger 32 is slidably received. The guide plungers 32 are connected by a cross bar 33 which is raised and lowered by a pneumatic ram 34. The guide plungers 32 have rollers 35 connected thereto which are received in the track 36 of the conveyor boom. Actuation of the ram in one direction will raise the outer end of the arm 23 and actuation of the ram in the opposite direction will lower the outer end of the arm.

The cart 26 has wheels 40, one of which is driven by reversible motor 41 in one direction or the other to move the platform 27 in or out, depending on the direction of drive of the motor. The platform 27 is supported by air bearings or cushions 42 (such as Cell No. S1-4266 manufactured by Airfloat of Decatur, Ill.). The air bearings or cushions 42 are supplied with air under pressure by air line 43.

The truck trailer 22 is supported by the platform 27 which has an elevated end 27a for the operator to stand on during loading or unloading of the trailer. Connected to the platform under the elevated end 27a are two racks 44 and 45 which are engaged by pinions 46 mounted on cart 26. The pinions 46 are driven by motor 47 which is connected by drive chain 48 to a drive pinion 49 on a shaft 50. A second drive chain 51 connects all the pinions 46, which are mounted on shafts 50 journaled at each corner of the cart. It will be noted that drive chain 51 is crossed so that two of the pinions 46 are driven clockwise and two driven counterclockwise. Thus, the pinions, two of which engage the rack on one side and two of which engage the rack on the opposite side, shift the platform laterally in one direction or the other when the motor 47 is driven in one direction or the other.

A short wedge-shaped ramp 25, as shown best in FIGS. 5, 6 and 7, is connected at one end on pivot axis H to the outer end of the conveyor boom 24 and terminates at the opposite end in a wedge-like edge. A power ram 52 has a cylinder 53 pivotally connected at one end to conveyor 24. The piston rod 54 of the ram is pivotally connected to ramp 25 below the pivot axis H thereof so that when the ram is extended the ramp is raised. As the ramp swings up and rod 54 crosses the pivot axis, ram 52 may be retracted to swing the ramp into a raised inoperable position, shown in dotted lines in FIG. 5. The ramp 25 uses a walking beam" principle for conveying objects on its upper surface. The walking-beam principle used by the ramp calls for a set of mobile wedge-shaped fingers 55 which are raised and lowered by circular cams 56. The cams 56 are eccentrically secured on shafts 57 and 58 which are journaled in fixed fingers 63, said fixed fingers having substantially planar lower surfaces, as seen in FIGS. 5 and 7. The cams 56 are rotatably received in circular holes 55a in the mobile fingers 55. As shown in FIG. 7, shafts 57 and 58 receive sprockets 59 thereon. Reversible motor 60 has a drive sprocket 61 which is connected by chain 62 to sprockets 59 to rotate shafts 57, 58. The mobile fingers 55 are interspersed with the stationary fingers 63 so that as the mobile fingers orbit about shafts 57, 58, the mobile fingers rise above, and sink below, the top of the stationary fingers. When motor 60 is driven in one direction, the mobile fingers 55 move in one direction when above the stationary fingers to move the cargo in that direction. As the orbiting fingers change direction, they drop below the stationary fingers on which the cargo is deposited. As the orbiting fingers again rise above the stationary fingers, they again advance the cargo another incremental distance in the same direction. When the motor 60 is driven in the reverse direction, the mobile fingers 55 will move in the opposite direction when above the stationary fingers 56 to move the cargo in incremental steps in the opposite direction.

When the ramp 25 is folded back as shown in FIG. 6, removable tines 70 may be mounted on the ramp. The hooked inner end 71 of the tines fits into a notch 72 in the ramp. A threaded clamp member 73 received in the tines screws down on the ramp to clamp the tines to the wedge.

The controls for loading-unloading arms 23 consist of a set of six switches 75, 76, 77, 78, 79 and 80 held in a small housing 81 that is attached to the belt of the operator. An extendable cord 82 connects the control housing to the load unload arm. Each switch has three positions: the upright, or central, position (in which the switches are shown in FIG. 9) where the switch is OFF, and the extreme position in either direction from the stop position where the switch activates the forward-reverse or up-down motions of the arm 23, platform 27, and/or ramp 25. One switch 75 controls the stop, or forward or reverse, motions of the motor 41 that powers the motorized cart 26 to move the platforms in or out. A second switch 76 controls the motor 47 that powers the sideways motion of the platforms. When these switches are on, air is simultaneously supplied to the platform air bearings 42. A third switch 77 controls the ram 34 that lifts or lowers the boom-conveyor. A fourth switch 78 controls the power ram 53 that tilts the ramp up or down. A fifth switch 79 controls the motor 60 which causes oscillation of the ramp conveying fingers 55. The sixth switch 80 controls the motor (not shown) which drives the belt 24a on the boom-conveyor. For safety reasons, an emergency stop button 83 may also be incorporated in the control housing.

When an inbound trailer 22 or truck arrives and is parked on a platform 27, an operator manipulates controls for the loading-unloading arms 23 to scoop articles onto the ramp 25 or position the ramp so that articles may be manually slid or placed on it. To pick up a specific article in the trailer, the platform 27 can be shifted laterally to align the article with the ramp 25, and the boom 24 and ramp 25 can be vertically adjusted to position the ramp in front of the article and on the floor of the trailer. The platform 27 can then be advanced to bring the article to a position where the ramp fingers 55 will move the article up the ramp and onto the conveyor belt.

Although the best mode contemplated for carrying out the present invention has been herein shown and described, it will be apparent that modification and variation may be made without departing from what is regarded to be the subject matter of the invention.

What is claimed is:

1. Apparatus for loading or unloading articles into or from a freight container comprising in combination, an elongated conveyor, means on said elongated conveyor for moving articles received thereon from one end thereof to the other, a ramp conveyor pivotally connected at one end to one end of said elongated conveyor and terminating at its opposite end in a wedge-like edge insertable under articles in the freight container, means on said ramp conveyor to move articles incrementally thereon from one end thereof to the other, said means including interdigitating stationary and movable fingers, said stationary fingers having a substantially planar lower surface, power operated means to raise and lower said one end of the elongated conveyor to bring the ramp conveyor to the approximate level of the floor of the freight container, and power operated means to pivot said ramp conveyor on the elongated conveyor to bring said ramp conveyor finger lower surface adjacent the level of the floor of the freight container to dispose said wedge-like edge for scooping articles from the container floor or depositing articles on the container floor.

2. The apparatus of claim 1 including control means spaced from said conveyors for operation of both of said power operated means.

* * * * *